United States Patent [19]

Molinet

[11] 3,986,859
[45] Oct. 19, 1976

[54] SYNERGIC COMPOSITIONS FOR THE CURATIVE TREATMENT OF PLANT DEFICIENCIES

[75] Inventor: Georges Molinet, Pau, France

[73] Assignee: Societe Nationale des Petroles d'Aquitaine, Courbevoie, France

[22] Filed: Aug. 21, 1974

[21] Appl. No.: 499,300

Related U.S. Application Data

[63] Continuation of Ser. No. 426,618, Dec. 12, 1973, abandoned, which is a continuation of Ser. No. 112,420, Feb. 3, 1971, abandoned.

[52] U.S. Cl. .................................. 71/1; 71/103; 71/DIG. 2
[51] Int. Cl.² .................................. C05F 11/00
[58] Field of Search ............... 71/1, 27, 28, 37, 50, 71/51, 53, 64 C, 103

[56] References Cited
UNITED STATES PATENTS

| | | | |
|---|---|---|---|
| 3,131,048 | 4/1964 | Balassa | 71/1 |
| 3,334,012 | 8/1967 | Herschler | 71/103 X |
| 3,361,555 | 1/1968 | Herschler | 71/103 |
| 3,365,287 | 1/1968 | Zaehner | 71/1 |
| 3,706,545 | 12/1972 | Gray et al. | 71/1 |

*Primary Examiner*—Charles N. Hart
*Assistant Examiner*—Robert H. Spitzer
*Attorney, Agent, or Firm*—Burgess Ryan and Wayne

[57] ABSTRACT

The present invention concerns new synergistic compositions for the treatment of trace element deficiencies in plants, containing a nitrate of the metal corresponding to the deficiency needing treatment, an alcohol acid or diacid, at least partly soluble in water, or an alkaline metal salt of these acids, and an organic sulphoxide of the formula

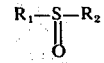

where $R_1$ and $R_2$ represent hydrocarbon groups with 1 to 12 carbon atoms, in particular dimethylsulphoxide.

These compositions provide an effective treatment to cure trace element deficiencies, in particular iron or magnesium deficiencies, in a wide range of different plants, without producing any phytotoxic side-effects.

19 Claims, No Drawings

SYNERGIC COMPOSITIONS FOR THE CURATIVE TREATMENT OF PLANT DEFICIENCIES

This is a continuation of application Ser. No. 426,618, filed Dec. 12, 1973, now abandoned, which is a continuation of the patent application, Ser. No. 112,420, filed Feb. 3, 1971, now abandoned.

The present invention concerns new compositions to treat plants suffering from deficiencies of trace elements such as iron, magnesium, zinc or manganese. More specifically, it concerns synergistic compositions to cure such deficiencies, for instance ferric and magnesium deficiencies, without producing any phytotoxic side-effects on the plants undergoing treatment.

Trace element deficiencies, for example a deficiency of iron, can be treated preventively by using chelates of the element involved, such as iron chelates, which are dug into the soil at the time of planting, or injected with a soil injector during the period of growth. This is no more than a preventive measure, however, expensive to apply and of very limited effectiveness.

It has also been proposed to treat ferric deficiencies through the leaves of the plants involved, by spraying them with aqueous solutions of ferrous sulphate. The effectiveness of such treatment is not very high, and it has to be repeated fairly frequently. Furthermore, pronounced phytotoxicity has been observed in plants treated in this way.

Attempts have been made to improve the effectiveness of the ferrous sulphate, by adding agents such as citric acid. They have very little effect, however, particularly as regards the phytotoxicity of the ferrous sulphate.

Similarly, the use of ferric nitrate, even combined with the dimethylsulphoxide, as a diffusion agent, has not brought about any particular improvement, since the effect of the ferric nitrate was less satisfactory than that of ferrous sulphate.

The present invention provides a remedy for the inadequacies of earlier methods, by offering phytotoxicity-free synergistic combinations, which provide very effective curative treatment for trace element deficiencies in plants, particularly ferric and magnesium deficiencies; they are applied to the leaves, using conventional spraying techniques, and the operation does not usually need to be repeated more than once.

The present invention results from the unexpected discovery that a synergistic effect occurs when a metal nitrate is combined with an alcohol-acid; in addition, phytotoxicity is practically nil.

Compositions in accordance with the invention, for the treatment of trace element deficiencies in plants, consist of a nitrate of the metal corresponding to the deficiency needing treatment, an alcohol-acid or di-acid, at least partly soluble in water, or an alkaline metal salt of these acids.

The nitrate used in the compositions according to the invention is the nitrate of the trace element metal that needs to be supplied to plants suffering from such deficiencies. For instance, ferric nitrate is used to treat ferric deficiency, magnesium nitrate to treat magnesium deficiency, zinc nitrate to treat zinc deficiency, etc.

The water-soluble, or at least partly water-soluble alcohol-acids or diacids included in the compositions according to the invention may be mono- or polycarboxylic and mono- or polyhydroxylated. Non-restrictive examples of such compounds are glycolic acid, lactic acid, hydroxypropionic-$\beta$ acid, hydroxybutyric-$\beta$ acid, 4-hydroxybutyric acid, mandelic acid, tropic acid, gluconic acid, tartronic acid, malic acid, tartric acid, citric acid, mucic acid, oxalic acid.

In certain cases, these acids may be replaced by their alkaline metal salts, preferably potassium or ammonium salts.

Another very important feature of the present invention is that the active effect of the metal nitrate and alcohol-acid mixture is increased considerably by the addition of a dialkyl sulphoxide. In particular, the amount of the mixture needed to produce the same required result is greatly reduced when the active ingredients are accompanied by a sulphoxide, especially a sulphoxide of a dialkyl with from 1 to 12 carbon atoms.

The compositions according to the invention preferably take the form of concentrated aqueous solutions, which are diluted as required when used. These concentrated solutions must have a pH value of less than 3, so as to keep the metal in solution during storage.

In some cases it may be useful to have the compositions according to the invention in the form of powder for mixing with water, obtained by intimate mixture of the sulphoxide, previously adsorbed on a suitable porous substance, with the nitrate and acid, or its alkaline metal salt, in a solid form. These solid mixtures also contain a small amount of a wetting agent, to ensure uniform suspension, when they are being diluted to the required concentration before being sprayed on to the plants.

The relative amounts of metal nitrate, alcohol-acid or the salt of this acid in the synergistic compositions according to the invention can vary within wide limits. The compositions may contain from 80 to 99% weight of metal nitrate to 20 to 1% weight of the alcohol-acid or its salt.

When the composition also contains a sulphoxide, the percentage weights of the different ingredients are 1 to 75%, and preferably 10 to 70%, metal nitrate; 1 to 20%, and preferably 5 to 10%, alcohol-acid or its salt; and the remainder, namely 5 to 98%, and preferably 20 to 85%, sulphoxide.

In addition to the nitrate, acid or salt and sulphoxide, the combination of which produces a marked synergistic effect, increasing the effectiveness of the treatment of plants for trace element deficiencies, the compositions according to the invention may also contain other ingredients such as leaf-dressings, pesticides, fungicides, tensio-active agents, foliage-adherence substances, vitamins, or hormones.

To produce the compositions according to the invention, in the form of concentrated aqueous solutions, the selected metal nitrate, the acid or its alkaline metal salt, and the sulphoxide are dissolved in a sufficient quantity of distilled or ion-exchanged water to ensure their complete dissolution; the resulting solution must have a low enough pH value to prevent the metal of the nitrate from being precipitated in the form of hydroxide: the order of dissolutions is usually arbitrary.

A recommended method of preparing the concentrated solutions is to dissolve the acid or its alkaline salt needed for the composition in the minimum amount of distilled or ion-exchanged water, prepare an aqueous solution of the metal nitrate in the remaining water, allowing if necessary for the weight of crystallization water in the salt, mix the two solutions together, add the sulphoxide to the resulting solution, and homogenize it.

If the pH of the concentrated solution needs to be raised to a higher level than that obtained by mixing these ingredients, a measured amount of an alkaline reagent in a concentrated aqueous solution, such as potassium or sodium carbonate or potassium or sodium hydroxide, can be added. This alkaline reagent must be added carefully, to avoid precipitation of the metal salt in the form of insoluble hydroxide. In calculating the amount of water required in the aqueous concentrate, allowance will be made for the moisture contained in the alkaline reagent solution.

If the composition is to contain other ingredients, such as liquid fertilizers or compounds containing trace elements other than the main trace element included in the form of a nitrate, a concentrated aqueous solution should be made from each such ingredient, and added to the concentrated solution of acid or its alkaline salt, or of metal nitrate, or to the solution resulting from the mixture of these two solutions, before or after addition of the sulphoxide.

In the case of foliar fertilizers consisting of a mixture of different ingredients, they may need to be acidified before being mixed with the other ingredients in the composition. This may be done by using the concentrated acid solution to which the fertilizers are to be added. in this way, subsequent precipitation in the aqueous concentrate can be prevented.

When the compositions according to the invention are intended for application to plants with thick, waxy foliage, one can add a small percentage of a wetting agent frequently used in phytosanitary product formulae, such as a sorbitan monopalmitate polyethoxyether, sorbitan monostearate polyethoxyether or sorbitan trioleate polyethoxyether, known commercially under the respective names of Tween 40, Tween 60 and Tween 85, or a condensation agent of alkyl phenol with ethylene oxide, known commercially under the name of Triton NE or Triton X30.

A small amount of a product to encourage these compositions to adhere to the leaves of the plants being treated may also be added, for example the products known commercially under the name of Colle Methylan or Spreader Sticker.

A wetting agent also has to be added when the compositions according to the invention are to include ingredients that are not soluble in water, such as fungicides, insecticides or other pesticides, and plant treatment products.

When being applied, the composition according to the invention, which is in the form of a concentrated aqueous solution, suspension or emulsion, or in powder form, is diluted to the required level of concentration in a liquid vehicle, normally water.

The total percentage in weight of the three basic ingredients of the diluted composition depends on various factors, including the extent of the deficiency in the plants being treated, the number of applications, method of application, and so on. It is generally between 0.1 and 15% in weight, and preferably between 1 and 10%.

The diluted composition may be applied to the plants by any existing method, for example with a mechanical or pneumatic spray, by painting cuts made during pruning, or by injection into tree-trunks.

In some cases the composition according to the invention may be prepared directly in a diluted form, in the concentration required for application, and kept in aerosol sprays.

The following examples, which are non-restrictive, will illustrate the present invention.

EXAMPLE 1

Tests involving the treatment of ferric deficiencies were carried out on vines of the Ugni-Blanc variety, four years old and planted in highly etiolating ground. There were no green leaves left on the plants, and the young leaves were pale yellow, with signs of canker between the veins.

For these tests, aqueous solutions were prepared, with the following concentrations of active ingredients:

Table 1

| Solution n° | $D_1$ | $D_2$ | $D_3$ | $D_4$ |
|---|---|---|---|---|
| Fe $(NO_3)_3$ (%) | 0.2 | 0.2 | 0.2 | 0.2 |
| Citric acid (%) | | | 0.04 | 0.04 |
| Dimethyl sulphoxide (%) | | 0.45 | | 0.45 |

Each of these solutions was sprayed mechanically on to a series of 10 vines, 250 ml to each vine, on July 26, 1969.

On Sept. 16, 1969, the return of greenness to each series of vines was observed, as well as to a series of untreated vines providing a control group, and another series of 10 vines treated with a 2% aqueous solution of ferrous sulphate on July 26, 1969, 250 ml to each vine.

The recovery of greenness was classified on the basis of the following scale:

0 – 2 : no recovery of greenness; death of the vine;
3 – 7 : isolated points of recovery on young leaves;
8 – 14 : belts of recovery of greenness, with visible effect on old leaves, or recovery confined to young leaves, with slight phytotoxicity in both cases;
15 – 20 : excellent, fast recovery of greenness in both new and old leaves, with absence of phytotoxicity.

The following results were obtained.

Table 2

| Type of treatment performed on 26th July 1969 | Recovery classification on 16th Sept. 1969 |
|---|---|
| None | 0 |
| $D_1$ | 6 |
| $D_2$ | 9 (a) |
| $D_3$ | 10 (b) |
| $D_4$ | 18 |
| Fe $SO_4$ | 9 |

(a) Recovery scattered and of low intensity
(b) Intense, concentrated recovery

Analysis of the results shown in Table 2 shows that ferric nitrate on its own ($D_1$) has little effect on vines suffering from ferric deficiency. The addition of dimethylsulphoxide ($D_2$) or citric acid ($D_3$) to the ferric nitrate brings about a slight improvement in the effectiveness of the composition. The effectiveness of such combinations is no better than that of ferrous sulphate, however, and they entail roughly the same degree of phytotoxicity.

The combination, according to the invention, of ferric nitrate, citric acid and dimethylsulphoxide ($D_4$) produces an unexpected synergistic effect, providing a very effective method of treating deficiencies, with complete absence of any phytotoxicity.

EXAMPLE 2

This example concerns the curative treatment of young vines, of the Ugni Blanc variety, suffering from ferric deficiency, by means of synergic compositions according to the present invention, sprayed on the leaves in a diluted form, during the second growth cycle of the young plants.

Aqueous solutions were prepared, with the following weight percentages of ingredients.

Table 3

| Solution n° | $E_1$ | $E_2$ | $E_3$ (e) | $E_4$ | $E_5$ (f) |
|---|---|---|---|---|---|
| Fe (NO$_3$)3 | 14.4 | 20 | 28.15 | 28.15 | 35 |
| Dimethylsulphoxide | 24 | 45 | 12 | 20 | 14 |
| Citric acid | 6 | 4 | 4 | 4 | 4.5 |
| Leaf dressing (c) | 38 | | | | |
| K$_2$ CO$_3$ | | | 13 | | 1.3 |
| Colle Methylan (d) | | | 0.5 | | 0.5 |
| Water | 17.6 | 31 | 42.35 | 47.75 | 44.7 |

(c) The product used is sold commercially under the name Quinoligo.
(d) Trade-name of a product to encourage adherence to the plants undergoing treatment.
(e) pH = 1.95.
(f) pH = 0.8

Each of these solutions was diluted as required with water, and each of the resulting diluted solutions was sprayed on to a series of vine plants.

On Sept. 16, 1969, the degree of recovery of greenness of the treated vines was observed, using the same scale as for Example 1, as well as the height of the vines in meters. In addition, and for comparison, the recovery of greenness and height of untreated vines, and of vines treated with an aqueous solution of ferrous sulphate, were noted.

The conditions under which the various treatments were carried out, and the results obtained, are shown below, in Table 4.

An analysis of the results shown in this table shows clearly the effectiveness of synergistic compositions in accordance with the invention, in the curative treatment of young vine plants suffering from ferric deficiency. This effectiveness is shown by the complete recovery of greenness by the etiolated leaves, even though the etiolation was advanced, and also by the faster rate of growth of the treated plants, which reached a height at least one and a half times that of untreated plants.

In comparison, treatment with ferrous sulphate produced only partial recovery of greenness in etiolated vines, and with no increase in their height.

EXAMPLE 3

This example shows the effectiveness of ferric nitrate-based synergic compositions in accordance with the present invention in the curvature treatment of vine plants suffering from ferric deficiency during their period of production, and the effect of such treatment on the yield of such vines.

The compositions used are the same as in Example 2; they were diluted to the required strength and sprayed on to the leaves of the vines needing treatment.

The treatment was carried out on a 5-year-old vineyard with a density of 4,968 Ugni-Blanc vines per hectare, planted 1.65 meters apart lengthwise and 1.15 meters apart breadthwise.

Normal soil-working operations had been carried out in this vineyard, namely earthing-up ploughing in Autumn, root-baring ploughing in Spring, and surface-dressing in Summer to prevent weeds.

At the time of treatment the vines showed advanced ferric deficiency, the leaves ranging from lemon- to champagne-coloured.

The anti-deficiency treatment was carried out on a series of 30 plants, with one series being left untreated on each occasion, to provide a control, and another series treated with an aqueous solution of iron sulphate.

On Sept. 16, 1969, the recovery of greenness in these vines was observed in accordance with the scale laid down in Example 1, as well as the average diameter in millimeters of the grapes produced by them. On 22nd October 1969, the yield, in terms of kg × alcohol content per hectare, and the average alcohol content of the grapes picked, were recorded.

The conditions under which the various treatment were carried out, and the results obtained, were as follows:

TABLE 4

| Formula | Concentration of aqueous solution as % of weight | Method of spraying + | Date of treatment | Total volume sprayed per ha in lit. | Number of plants treated | Restoration of greenness, on 9.16.1969 | | Height of saplings in m. on 9.16.1969 | |
|---|---|---|---|---|---|---|---|---|---|
| | | | | | | Treated | Untreated | Treated | Untreated |
| $E_1$ | 1 | M | 6.9.1969 | 700 | 50 | 16 | 8 | 2 | 0.8 |
| | 1.5 | M | 6.25.1969 | 700 | 70 | 18 | 7 | 2.3 | 1.7 |
| | 3 | P | 7.3.1969 | 150 | 80 | 17 | 8 | 2.8 | 2 |
| $E_2$ | 1.1 | M | 6.25.1969 | 700 | 70 | 19 | 8 | 2.2 | 1.7 |
| | 1.5 | M | 6.9.1969 | 700 | 50 | 18 | 8 | 1.5 | 0.8 |
| $E_3$ | 1.33 | M | 6.25.1969 | 700 | 70 | 18 | 9 | 2.2 | 1.7 |
| | 2 | P | 7.3.1969 | 150 | 80 | 18 | 9 | 2.8 | 2 |
| | 7.5 | P | 7.3.1969 | 450 | 80 | 17 | 10 | 2.8 | 2 |
| $E_4$ | 3 | M | 6.9.1969 | 700 | 50 | 17 | 9 | 1.3 | 0.8 |
| | 3 | M | 6.25.1969 | 700 | 70 | 18 | 8 | 2 | 1.7 |
| $E_5$ | 1 | P | 7.3.1969 | 150 | 80 | 16 | 9 | 2.5 | 2 |
| | 1.15 | M | 6.25.1969 | 700 | 20 | 18 | 8 | 1.4 | 0.7 |
| Ferrous sulphate | 2 | P | 7.3.1969 | 150 | 80 | 12 | 9 | 2 | 2 |

+ M = Mechanically
P = Pneumatically

TABLE 5

| Formula | % weight in solution | Sprayings method + | Sprayings Number | Date of treatment | Volume sprayed at each treatment in lit/ha | Restoration of greenness, on 9.16.1969 Treated | Restoration of greenness, on 9.16.1969 Untreated | Average diameter of grapes in mm on 9.26.1969 Treated | Average diameter of grapes in mm on 9.26.1969 Untreated | Yield, in kg ×alc. cont. per ha, on 10.22.1969 Treated | Yield, in kg ×alc. cont. per ha, on 10.22.1969 Untreated | Alcoholic content, in degrees, on 10.22.1969 Treated | Alcoholic content, in degrees, on 10.22.1969 Untreated |
|---|---|---|---|---|---|---|---|---|---|---|---|---|---|
| $E_1$ | 1 | M | 1 | 6.28.69 | 700 | 18 | 8 | 10.21 | 7.51 | 53800 | 19800 | 10.4 | 7.7 |
|  | 1 | M | 3 | 7.2.69 7.4.69 7.7.69 | 700 | 19 | 5 | 10.46 | 7.73 | 186300 | 74600 | 10.7 | 10.4 |
|  | 5 | P | 4 | 7.15.69 7.24.69 7.31.69 8.9.69 | 125 | 18 | 5 | 10.82 | 7.85 | 125000 | 53500 | 11.6 | 9.2 |
| $E_3$ | 1.5 | M | 1 | 7.2.69 | 700 | 19 | 8 | 11.25 | 6.64 | 48400 | 25900 | 11.2 | 9.9 |
|  | 1.5 | M | 3 | 7.2.69 7.4.69 7.7.69 | 700 | 19 | 5 | 11.3 | 7.73 | 116500 | 74600 | 10.6 | 10.2 |
|  | 2 | P | 2 | 7.10.69 7.15.69 | 125 | 14 | 8 | 9.24 | 7.65 | 43500 | 35300 | 11.5 | 10.8 |
|  | 5 | P | 2 | 7.10.69 7.15.69 | 125 | 16 | 8 | 10.37 | 7.65 | 116700 | 35300 | 11.2 | 10.6 |
|  | 8 | P | 4 | 7.15.69 7.24.69 7.31.69 8.9.69 | 125 | 16 | 8 | 10.4 | 7.65 | 112800 | 36400 | 11.1 | 10.7 |
| $E_4$ | 2 | M | 1 | 6.28.69 | 700 | 18 | 8 | 9.81 | 7.18 | 30500 | 6300 | 11.5 | 9.4 |
| $E_5$ | 1 | M | 1 | 6.28.69 | 700 | 15 | 8 | 9.84 | 7.29 | 23900 | 18100 | 10.4 | 10.3 |
|  | 1 | M | 3 | 7.2.69 7.4.69 7.7.69 | 700 | 17 | 5 | 10.07 | 7.73 | 158000 | 74500 | 10.7 | 10.6 |
| Ferrous sulphate | 2 | P | 2 | 7.10.69 7.15.69 | 125 | 12 | 8 | 9.23 | 7.65 | 42100 | 35600 | 10.8 | 9.3 |

These results show that the treatment of fruit-bearing plants, in this case vines, with ferric nitrate-based compositions according to the present invention, not only helps to cure ferric deficiency, but also increases the quality and quantity of the crop, and thus brings about a considerable improvement in the yield, per unit of area, of ground planted with fruit-bearing plants, in particular vineyards.

EXAMPLE 4

Tests were carried out to treat vines, of the Ugni-Blanc variety, suffering from magnesium deficiency, using various magnesium-nitrate-based aqueous solutions, with the following percentages in weight of active ingredients.

Table 6

| Solution n°. | $F_1$ | $F_2$ | $F_3$ | $F_4$ |
|---|---|---|---|---|
| $Mg(NO_3)_2$ | 2 | 0.5 | 0.5 | 0.5 |
| Dimethylsulphoxide |  | 0.5 |  | 0.5 |
| Citric acid |  |  | 0.05 | 0.05 |

Each of these solutions was sprayed on to a series of 25 vines, using a mechanical spraying device, the dose being 250 ml to each plant. This was done on Aug. 12, 1969.

On Oct. 10, 1969 the appearance of the treated vines, and of untreated vines providing a control, was examined.

The following results were obtained.

Table 7

| Treatment applied | Appearance of vines on 10th Oct. 1969 |
|---|---|
| None | 25 vines showing deficiency 325 discoloured leaves |
| $F_1$ | 16 vines showing deficiency 180 discoloured leaves |
| $F_2$ | 14 vines showing deficiency 130 discoloured leaves |
| $F_3$ | 12 vines showing deficiency |

Table 7-continued

| Treatment applied | Appearance of vines on 10th Oct. 1969 |
|---|---|
| $F_4$ | 118 discoloured leaves 8 vines showing slight deficiency 80 partially discoloured leaves |

These results show clearly that the combination of citric acid and dimethylsulphoxide with magnesium nitrate produces a pronounced synergistic effect, in the curative treatment of magnesium deficiency in vines (solution $F_4$).

The effectiveness of magnesium nitrate on its own ($F_1$) or combined with citric acid ($F_3$) or dimethylsulphoxide ($F_2$) is much more limited.

EXAMPLE 5

The earlier examples were repeated, except that the citric acid was replaced with a similar quantity of tartric acid. The results, shown below, reveal that the effectiveness of tartric acid is slightly greater than that of citric acid.

Table 8

| Type of treatment on 26th July 1969 | Recovery classification on 16th Sept. 1969 |
|---|---|
| None | 0 |
| $D_1$ | 6 |
| $D_2$ | 9 |
| $D_3$ | 11 |
| $D_4$ | 20 |
| $FeSO_4$ | 9 |

EXAMPLE 6

The tartric acid was replaced with lactic acid. The results were more or less the same as in Example 5.

What we claim is:

1. A composition useful in treating trace element deficiencies in plants, said composition comprising a metal nitrate, a substance selected from the group consisting of citric acid and an alkali-metal or alkaline earth metal salt of said acid and a dialkyl sulphoxide of the formula

wherein $R_1$ and $R_2$ are alkyl groups containing from 1 to 12 carbon atoms, and wherein, in said composition, said metal nitrate is present in an amount varying between 1 and 75%, said acid or salt is present in an amount varying between 1 and 20% and said sulphoxide is present in an amount varying between 5 and 98% the ratio of said metal nitrate to said acid or salt varying between about 2 : 1 to about 10 : 1.

2. A composition according to claim 1 wherein the metal nitrate is ferric nitrate or magnesium nitrate.

3. A composition according to claim 2 wherein the nitrate is ferric nitrate.

4. A composition according to claim 2 wherein the nitrate is magnesium nitrate.

5. A composition according to claim 1 wherein said substance is citric acid.

6. A composition according to claim 1 wherein the sulphoxide is dimethylsulphoxide.

7. A composition according to claim 1, wherein said metal nitrate is present in an amount varying between 10 and 70%, said acid or salt is present in an amount varying between 5 and 10% and said sulphoxide is present in an amount varying between 20 and 85%.

8. A composition according to claim 7 in which said metal nitrate is ferric nitrate and said acid is citric acid and said sulphoxide is dimethyl sulfoxide.

9. A composition according to claim 1, containing in addition to the active ingredients, leaf dressings.

10. A composition according to claim 1 containing in addition to the three active ingredients, a non-phyto toxic pesticide.

11. A process for treating trace element deficiencies in plants which comprises applying to said plants, a dilute aqueous preparation in the form of a solution, emulsion or suspension of a composition as defined in claim 1.

12. A process according to claim 11 wherein the metal nitrate is ferric nitrate or magnesium nitrate.

13. A process according to claim 12 wherein the nitrate is ferric nitrate.

14. A process according to claim 12 wherein the nitrate is magnesium nitrate.

15. A process according to claim 11 wherein said substance in said composition as defined in claim 1 is citric acid.

16. A process according to claim 11 wherein the sulphoxide in said claim 1 is dimethylsulphoxide.

17. A process according to claim 11 wherein said active ingredients are present in an amount varying between 1 and 10%.

18. A process according to claim 11 wherein the composition is applied to plants by spraying said composition onto the leaves.

19. A composition according to claim 1 wherein the percentage weight of metal nitrate is 10 to 70% and the acid salt is 5 to 10%, respectively.

* * * * *

UNITED STATES PATENT OFFICE
CERTIFICATE OF CORRECTION

Patent No. 3,986,859            Dated October 19, 1976

Inventor(s) Georges Molinet

It is certified that error appears in the above-identified patent and that said Letters Patent are hereby corrected as shown below:

Please insert the convention priority of this application as follows:

-- French Patent Appln. 70 04309 filed February 6, 1970--

Signed and Sealed this nineteenth Day of July 1977

[SEAL]

Attest:

RUTH C. MASON
*Attesting Officer*

C. MARSHALL DANN
*Commissioner of Patents and Trademarks*